United States Patent
Hamburg et al.

[11] Patent Number: 5,265,416
[45] Date of Patent: Nov. 30, 1993

[54] ON-BOARD CATALYTIC CONVERTER EFFICIENCY MONITORING

[75] Inventors: Douglas R. Hamburg, Bloomfield Hills; Kelvin L. Dobbins, Dearborn, both of Mich.

[73] Assignee: Ford Motor Company, Dearborn, Mich.

[21] Appl. No.: 935,808

[22] Filed: Aug. 27, 1992

[51] Int. Cl.$^5$ ............................ F01N 3/25; F02D 7/00
[52] U.S. Cl. .................................... 60/274; 60/277
[58] Field of Search ..................... 60/277, 274, 276; 123/446, 691, 673

[56] References Cited

U.S. PATENT DOCUMENTS

| | | | |
|---|---|---|---|
| 3,576,182 | 4/1971 | Howland | 123/446 |
| 3,916,622 | 11/1975 | Gospodar | 60/277 |
| 3,962,866 | 6/1976 | Neidhard et al. | |
| 3,969,932 | 7/1976 | Rieger et al. | |
| 4,007,589 | 2/1977 | Neidhard et al. | |
| 4,015,428 | 4/1977 | Kawai | 60/277 |
| 4,023,358 | 5/1977 | Maurer et al. | 60/277 |
| 4,121,548 | 10/1978 | Hattori et al. | |
| 4,622,809 | 11/1986 | Abthoff et al. | |
| 4,962,741 | 10/1990 | Cook et al. | |
| 5,077,970 | 1/1992 | Hamburg | |

FOREIGN PATENT DOCUMENTS

| | | |
|---|---|---|
| 6445913 | 2/1989 | Japan . |
| 2178857 | 1/1987 | United Kingdom . |

OTHER PUBLICATIONS

Clemens et al.—SAE Technical Paper 900062, Detection of Catalyst Performance Loss Using On-Board Diagnostics, Feb. 26–Mar. 2, 1990.

*Primary Examiner*—Tony M. Argenbright
*Assistant Examiner*—M. Macy
*Attorney, Agent, or Firm*—Lorraine S. Melotik; Roger L. May

[57] ABSTRACT

Apparatus, method and system are provided for monitoring catalytic converter efficiency in treating exhaust gas from an internal combustion engine. The air/fuel ratio fed to the engine is perturbed on a cylinder-to-cylinder basis above and below a mean or average air/fuel ratio. The signal from an exhaust gas exposed to the exhaust gas sensor downstream of the converter for the perturbation interval is compared to the signal for a non-perturbation interval. A signal is generated when the comparison indicates catalytic converter efficiency below a minimum acceptable level. The comparison may be carried out by comparing the difference in the mean value of the EGO sensor output signal for the perturbation and non-perturbation intervals to a preselected and stored reference value corresponding to the minimum acceptable efficiency. The efficiency monitoring test system may be incorporated into fuel control means for controlling air/fuel ratio during normal engine operation.

19 Claims, 3 Drawing Sheets

ON-BOARD CATALYTIC CONVERTER EFFICIENCY MONITORING

FIELD OF THE INVENTION

This invention relates to monitoring of catalytic converter efficiency in treating exhaust gas from an internal combustion engine. In particular, the invention relates to on-board monitoring of the efficiency of the catalytic converter using an exhaust gas oxygen (EGO) sensor downstream of the catalytic converter.

BACKGROUND OF THE INVENTION

A properly operating catalytic converter dampens oxygen concentration fluctuations in the exhaust stream. A system proposed in SAE paper No. 900062, Detection of Catalyst Performance Using On-Board Diagnostics, employs two exhaust gas oxygen sensors, one upstream and one downstream of the catalytic converter, to detect oxygen content in the exhaust gas. The system employs test signals in the form of an air/fuel ratio swing on both sides of stoichiometry at predetermined rates or frequencies caused by fuel control system perturbations. A determination of catalytic converter efficacy is said to be made by comparing the difference in response patterns between the upstream and downstream EGO sensors. In such a system, the monitoring results depend on signals from two EGO sensors which may have different characteristics, due either to manufacturing tolerances or to differential aging over a period of use.

A number of systems are known which attempt to determine catalytic converter efficacy based largely on measures of the oxygen storage capability of the converter. A converter with reduced oxygen storage capability may, however, nevertheless function with acceptable efficiency in treating exhaust gas. That is, the treated exhaust gas may meet emission requirements notwithstanding such reduced oxygen storage capability, particularly by effective use of oxygen components present in the exhaust gas. In such cases, an accurate catalytic converter efficiency test could be less directly related to oxygen storage capability. It is particularly desirable to provide a monitoring system and method in a fuel control system.

SUMMARY OF THE INVENTION

According to a first aspect of the invention, an apparatus, method and system are provided for on-board monitoring of catalytic converter efficiency in treating exhaust gas from an internal combustion engine. The terms "efficacy" and "efficiency" are used herein interchangeably to mean a measure or evaluation of the effectiveness of the catalytic converter in treating the exhaust gas. A catalytic converter and an exhaust gas conduit are provided for passing exhaust gas to and from the catalytic converter. An EGO sensor is exposed to the exhaust gas downstream of the catalytic converter for generating a downstream output signal corresponding to the oxygen content level of the downstream exhaust gas. An air/fuel ratio perturbation means is provided for perturbing the air/fuel ratio at which fuel and air are supplied to the engine during a perturbation period. More specifically, the air/fuel ratio is perturbed alternately, cylinder-to-cylinder, above and below a mean air/fuel ratio. That is, individual cylinders are fed, in their firing sequence, alternately rich and lean air/fuel mixtures. Preferably, the perturbations and deviations are symmetrical above and below the mean ratio, such that there is no overall rich or lean shift of the fuel mixture caused by the perturbation means. Comparison means are provided for performing a comparison of the downstream output signal for exhaust gas from the engine during the perturbation period to the downstream output signal for exhaust gas from the engine during an adjacent time period. The term "adjacent time period" means a time period either immediately preceding or immediately following the period during which the air/fuel mixture is subjected to the aforesaid cylinder-to-cylinder perturbations. Test result signal means generates a signal indicating the result of the test, at least in those cases when the comparison indicates catalytic converter efficiency below a minimum acceptable efficiency.

According to a second aspect of the invention, the aforesaid apparatus, method and system for on-board monitoring of the catalytic converter efficiency is incorporated in a system for controlling the air/fuel ratio for the engine during normal engine operation, with the converter monitoring being carried out periodically. By "periodically" is meant occasionally or intermittently, for example once or more often each time operation is restarted after a period of non-operation. Preferred embodiments of the apparatus and method of the invention in accordance with this second aspect are described and discussed in greater detail below.

Preferred embodiments of the invention provide significant advantages, particularly with respect to on-board monitoring of the efficiency of a catalytic converter, such as a three way catalyst type converter installed on a motor vehicle to reduce emissions of HC, CO and $NO_x$ from the vehicle's engine. Such preferred embodiments, discussed in greater detail below, provide the advantages of on-board converter efficiency monitoring in conjunction with closed loop fuel control systems. Since the efficiency monitoring relies on comparison of the output signal from the same downstream EGO sensor during perturbation and non-perturbation test periods, they are not subject to errors caused by differences in manufacturing tolerances, aging, etc. between an upstream and downstream EGO sensor. Additional features and advantages of various preferred embodiments will be better understood in view of the following disclosure and detailed description.

BRIEF DESCRIPTION OF THE DRAWINGS

Various preferred embodiments of the invention are described below with reference to the accompanying drawings wherein.

DETAILED DESCRIPTION OF CERTAIN PREFERRED EMBODIMENTS

Figure 1:
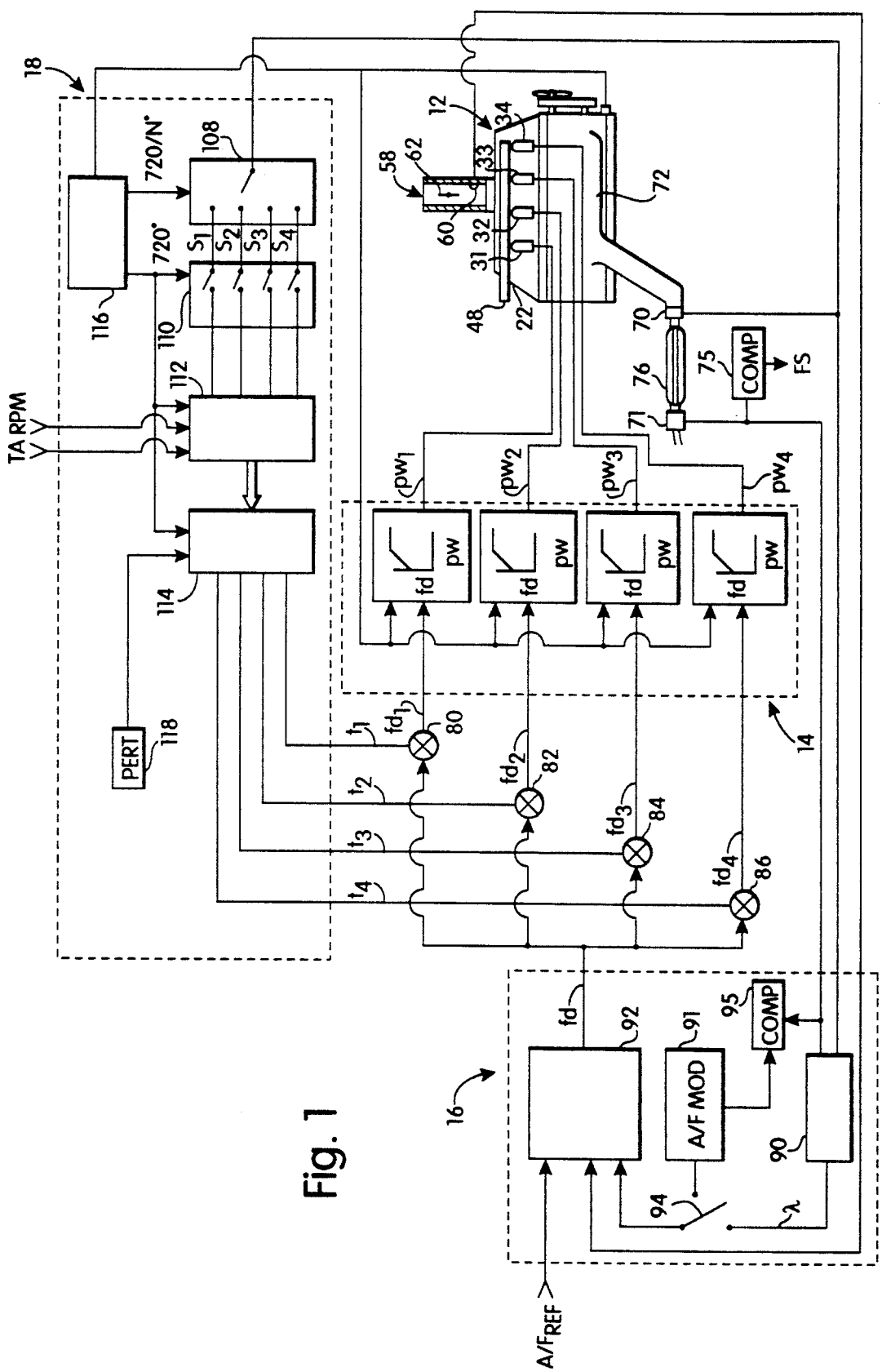
FIG. 1 is a schematic block diagram of an internal combustion engine and a fuel control system for the engine, comprising on-board monitoring means in accordance with the present invention for periodically testing catalytic converter efficiency via cylinder-to-cylinder air/fuel perturbation.

As noted above, converter efficiency monitoring is preferably "periodic", meaning occasionally or intermittently, for example once or more often each time operation is restarted after a period of non-operation. In that regard, reference below to initiating the test or test period during normal or substantially steady state operation of the engine is intended to mean starting the tests when the engine is in closed loop fuel control operation, preferably under normal speed and load conditions. In preferred embodiments, the engine will remain under such conditions and at steady state during the entire test period. Applicable regulations may require that the test (1) be performed at the earliest opportunity after the beginning of closed loop fuel control operation for each driving cycle, (2) have a duration of no longer than 20 seconds, and (3) be performed at a reasonably steady vehicle speed between 20 mph and 50 mph, all accelerations and decelerations being less than 0.5 mph/second over any two second interval.

The aforesaid catalytic converter monitoring is most advantageously implemented in embodiments comprising a closed loop fuel control system utilizing both an upstream and a downstream EGO sensor in the normal fuel control mode. Accordingly, the detailed description which follows will focus on dual EGO fuel control system embodiments of the invention. Various alternative closed loop fuel control systems are known which can be readily employed with the catalytic converter monitoring feature disclosed herein.

Preferred closed loop fuel control systems into which the present on-board catalytic converter monitoring can be incorporated are disclosed in U.S. Pat. No. 4,962,741 issued to Cook et al. In systems of the type taught by Cook et al, a fuel control system controls average air/fuel ratio among the N cylinders of an internal combustion engine with air/fuel ratio correction on an individual cylinder basis, i.e., cylinder-to-cylinder, by utilizing known feedback control techniques. Specifically, the preferred systems provide a control system in which air/fuel ratios for each of the cylinders is corrected via at least one oxygen sensor exposed to the engine exhaust gas. In general, such systems comprise sampling the exhaust gas EGO sensor once each period associated with a combustion event in one of the cylinders to generate N periodic output signals. The N periodic output signals are stored. Concurrently, each of the N periodic output signals are read from storage once each output period to define N non-periodic correction signals, each being related to the air/fuel ratio of a corresponding cylinder. The output period is defined as a predetermined number of engine revolutions required for each of the cylinders to have a single combustion event. The mixture of air and fuel supplied to each of the cylinders is corrected in response to its corresponding correction signal. Thus, conventional feedback control techniques are used to obtain individual cylinder air/fuel ratio control. It will be recognized by those skilled in the art in view of the present disclosure, that such cylinder-to-cylinder control capability can be advantageously utilized in performing cylinder-to-cylinder perturbation of the air/fuel ratio during the perturbation period of the catalytic converter monitoring test. Accordingly, for purposes of illustration and not limitation, certain preferred embodiments are now disclosed and discussed below incorporating closed loop fuel control means providing cylinder-to-cylinder control features together with the aforesaid on-board catalytic converter monitoring feature.

Referring to FIG. (1), internal combustion engine 12 is shown coupled to fuel controller 14, average air/fuel controller 16, and individual cylinder air/fuel controller 18. In this particular embodiment, engine 12 is a 4-cycle, 4-cylinder internal combustion engine having intake manifold 22 with electronically actuated fuel injectors 31, 32, 33 and 34 coupled thereto in proximity to four respective combustion cylinders. This type of fuel injection system is commonly referred to as port injection Air intake 58, having mass air flow meter 60 and throttle plate 62 coupled thereto, is shown communicating with intake manifold 22. Fuel rail 48 is connected to fuel injectors 31, 32, 33 and 34 for supplying pressurized fuel from a conventional fuel tank and fuel pump. Fuel injectors 31, 32, 33 and 34 are electronically actuated by respective signals $pw_1$, $pw_2$, $pw_3$ and $pw_4$ from fuel controller 14 for supplying fuel to respective engine cylinders in proportion to the pulse width of signals $pw_{1-4}$.

In normal fuel control mode, exhaust gas oxygen sensor (EGO) 70 upstream of three-way catalytic converter 76, and EGO sensor 71 downstream of the converter 76, conventional 2-state EGO sensors in this embodiment, provide EGO signals related to the air/fuel ratio in the engine cylinders. When the air/fuel ratio in the cylinders rises above a reference value, EGO sensor 70 switches to a high output. Similarly, when the air/fuel ratio in the cylinders falls below a reference value, EGO sensor 70 switches to a low output. This reference value is typically correlated with an air/fuel ratio of 14.7 lbs. air per 1 lb. of fuel, referred to herein as stoichiometry. The EGO sensor switch point may be set for stoichiometry at a different ratio, for example, a lean burn ratio. The operating window of converter 76 is centered at stoichiometry for minimizing the amount of $NO_x$, CO, and HC emissions. The output signal of downstream EGO sensor 71 is used typically in a corresponding downstream closed loop air/fuel ratio feedback control loop, in effect trimming the upstream switch point in accordance with known techniques.

Average air/fuel controller 16 provides fuel demand signal fd in response to mass air flow (MAF) signal from mass air flow meter 60 and the feedback EGO signal from EGO sensor 70. Fuel demand signal fd is provided such that fuel injectors 31-34 will collectively deliver the demanded amount of fuel for achieving an average air/fuel ratio among the cylinders.

Individual cylinder air/fuel controller 18 provides trim signals $t_1$, $t_2$, $t_3$ and $t_4$ in response to the feedback EGO signal and other system state variables, such as engine speed (RPM) and engine load or throttle angle (TA). Trim signals $t_{1-4}$ provide corrections to fuel demand signal fd for achieving the desired air/fuel ratio for each individual cylinder. In this particular example, trim signals $t_{1-4}$ correct fuel demand signal fd via respective summers 80, 82, 84, and 86 for providing corrected fuel demand signals $fd_1$, $fd_2$, $fd_3$, and $fd_4$. Fuel controller 14 then provides electronic signals $pw_{1-4}$, each having a pulse width related to respective $fd_{1-4}$ signals, such that injectors 31-34 provide a fuel amount for achieving the desired air/fuel ratio in each individual cylinder.

Average air/fuel controller 16 includes conventional feedback controller 90 with suitable signal processing means for the output signals from EGO sensors 70, 71, and multiplier/divider 92. In a conventional manner, feedback controller 90 generates corrective factor lambda $\lambda$ based on processed EGO signals and a gain factor ($G_1$). Correction factor $\lambda$ is therefore related to the deviation in average air/fuel ratio among cylinder 1-4 from the reference air/fuel ratio $A/F_{REF}$. Multiplier/divider 92 multiplies the inverse of the reference or desired air/fuel ratio times the MAF signal to achieve a reference fuel charge. This value is then divided by correction factor λ from feedback controller 90 to generate desired fuel charge signal fd.

Average air/fuel ratio controller 16 maintains the average air/fuel ratio among the cylinders near a reference value. The air/fuel ratio may vary from cylinder to cylinder due to such factors as fuel injector tolerances and wear, engine thermodynamics, variations in air/fuel mixing through intake manifold 22, and variations in cylinder compression and intake flow. Individual cylinder air/fuel controller 18 includes demultiplexer 108, synchronizer 110, observer 112, controller 114, and timing circuit 116. In general, demultiplexer 108 and synchronizer 110 convert the time varying, periodic output of the upstream EGO signal into time invariant, sampled signals suitable for processing in a conventional feedback controller. Stated another way, the EGO signal is time variant or periodic because variations in individual air/fuel ratios of the cylinders result in periodic fluctuations of the exhaust output. Demultiplexer 108 and synchronizer 110 convert the EGO signal into four individual signals ($S_1$, $S_2$, $S_3$ and $S_4$) which are time invariant or non-periodic. Observer 112 correlates information from signals $S_{1-4}$ to the previous combustion event for each cylinder.

Demultiplexer 108 includes a conventional A/D converter sampled every 720/N°, for a four stroke engine, where N is the number of engine cylinders. In the case of a 2-cycle engine, the sample rate (i) is 360/N°. For the example presented herein, N is 4 such that the sample rate (i) is 180°. Thus in the present case, the EGO signal is sampled at a sample rate (i) of 180° until four samples ($S_{1-4}$) are taken (i.e., 720°). Each sample is stored in a separate storage location. During a subsequent engine cycle, another four samples ($S_{1-4}$) are taken. The sampled values of the EGO signal are limited to an upper threshold associated with lean operation (1 volt in rich operation (minus one volt in this example). All four samples ($S_{1-4}$) are simultaneously read from storage each output period of by synchronizer 110. Accordingly, in each 720° output period, four simultaneous samples are read which are now time invariant or non-periodic sampled signals. In response to each sampled signal ($S_{1-4}$), and also in response to engine speed (RPM) and engine load (based on throttle angle signal TA) signals, observer 112 predicts the air/fuel ratio conditions in the corresponding cylinder utilizing conventional techniques. At a particular engine speed and load, a combustion event in one cylinder will effect the EGO signal a predetermined time afterwards.

Controller 114, a proportional-integral controller operating at a sample rate of 720° in this embodiment, then generates four trim values $t_1$, $t_2$, $t_3$ and $t_4$. Each trim value is added to, or subtracted from, fuel demand signal fd in respective summers 80, 82, 84 and 86 to generate respective individual fuel demand signals $fd_1$, $fd_2$, $fd_3$, and $fd_4$. In response, fuel controller 14 provides corresponding pulse width signals $pw_{1-4}$ for actuating respective fuel injectors 31-34.

Operation of the system for periodic catalytic converter efficiency monitoring while continuing to control fuel flow to the engine is now described with reference to additional features illustrated in FIG. 1. According to this preferred embodiment, the controlled perturbation of cylinder-to-cylinder air/fuel distribution is employed for periodic catalytic converter efficiency testing in a motor vehicle having a dual closed loop fuel control system employing an upstream and downstream EGO sensor for pre-converter and post-converter, respectively, air/fuel feedback control loops, such as the system illustrated in FIG. 1. A test interval typically will commence during substantially steady state or normal engine operation and will span about 20 seconds. A sufficient change in engine operation during the test may require the test be discontinued and restarted at a later opportunity, and multiple attempts may be required before a valid test is completed. In that regard, referring to the preferred embodiment of FIG. 1, initiating the test period during substantially steady or normal engine operation means starting the test period when the engine is in dual closed loop operation.

Figure 2A:
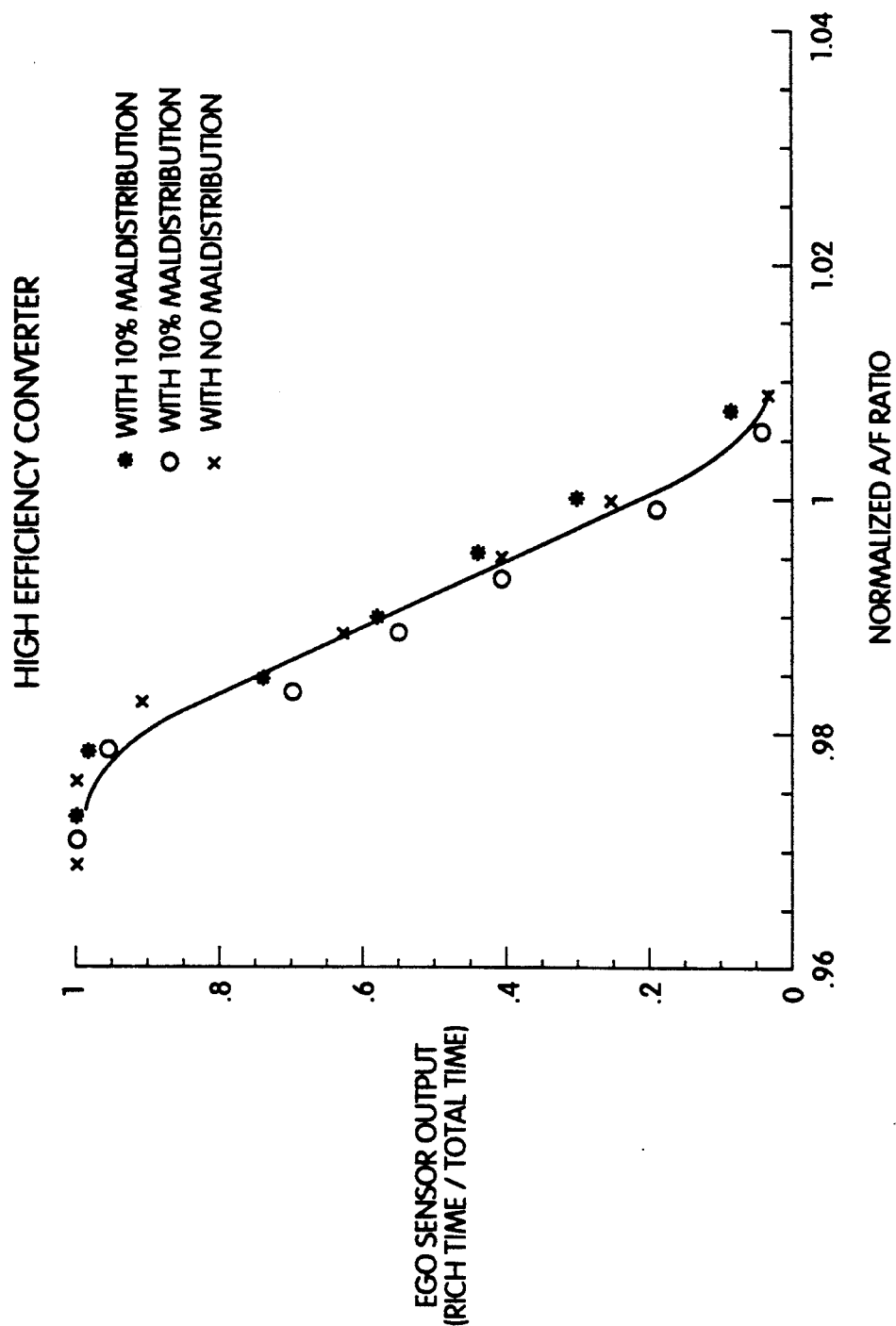
FIGS. 2A and 2B are graphic representations of the effect of cylinder-to-cylinder air/fuel ratio maldistribution for a high efficiency catalytic converter and a low efficiency catalytic converter, respectively.
Figure 2B:
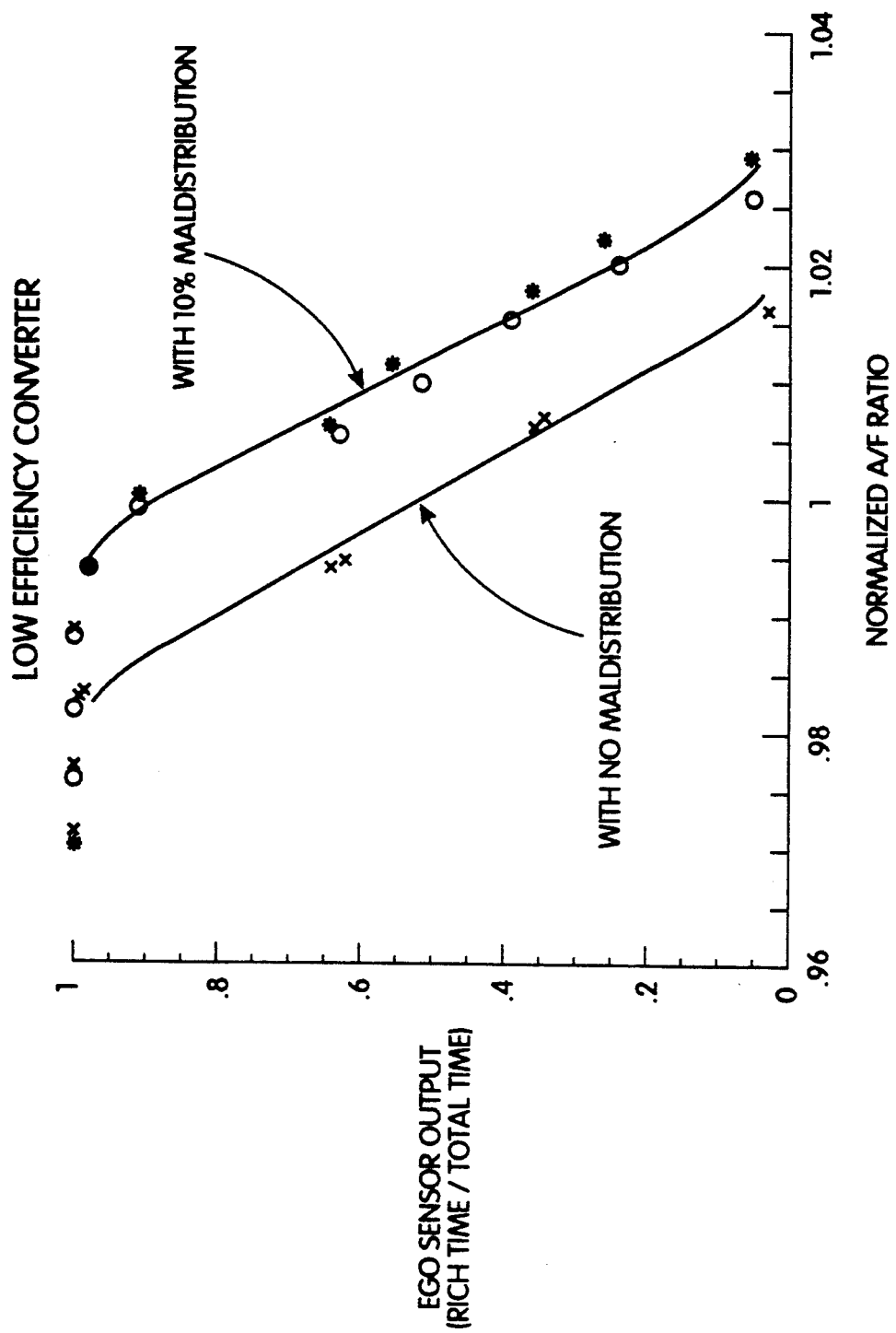

While not wishing to be bound by theory, it is mentioned here that the cylinder-to-cylinder perturbation method feature of the catalytic converter efficiency monitoring presently is understood to rely on the fact that the perceived stoichiometric air/fuel ratio switch point of a switch-type exhaust gas EGO sensor located downstream of the converter depends on both the efficiency of the converter and the cylinder-to-cylinder air/fuel distribution in the engine. This phenomenon is illustrated in FIGS. 2A and 2B. FIG. 2A shows the measured downstream exhaust gas EGO sensor output for a good converter; FIG. 2B shows the measured downstream exhaust gas EGO sensor output for a low efficiency converter. In both cases, EGO sensor output is shown both with and without cylinder-to-cylinder air/fuel maldistribution. It can be seen that the EGO sensor output is substantially unaffected by the cylinder-to-cylinder air/fuel maldistribution in the case of the high efficiency converter of FIG. 2A, whereas the EGO sensor output is measurably affected by cylinder-to-cylinder air/fuel maldistribution in the case of the low efficiency converter of FIG. 2B. In both graphs, the EGO sensor output is shown as the portion of time the output signal is on the rich (rather than lean) side of the EGO sensor switchpoint. This is plotted against normalized air/fuel ratio, that is, actual average air/fuel ratio over stoichiometric air/fuel ratio.

It can be appreciated from these results that comparing the difference in the downstream EGO sensor output for exhaust gas from the engine during a period of cylinder-to-cylinder air/fuel maldistribution to the same EGO sensor output for a test period without such maldistribution will permit a conclusion as to the efficiency level of the converter. If the EGO sensor output changes by more than a preselected value as a result of cylinder-to-cylinder air/fuel ratio perturbation, the converter can be judged to have unacceptably low efficiency. Correspondingly, if the EGO sensor output changes by less than the preselected value, the converter can be found to pass the efficiency test. Most preferably, the average air/fuel ratio remains substantially constant during the test period. Since cylinder-to-cylinder air/fuel maldistribution can cause a shift in the closed loop air/fuel ratio operating point of the engine (due to a possible shift in exhaust gas EGO sensor output), at least the upstream control loop should be opened during the test and the normal feedback signal (LAMBSE) should be frozen at its value as of the beginning of the test. In this manner, any shift which occurs in the output of the downstream EGO sensor will be due to the maldistribution effect and not to any actual air/fuel ratio shift in the engine. If the engine operating conditions change during the test such that the engine air/fuel ratio changes (for example, due to a change in the engine speed and/or load demands), the test could be aborted and restarted later.

In accordance with a first preferred technique for catalytic converter efficiency monitoring employing cylinder-to-cylinder air/fuel maldistribution, an onboard computer first determines that a converter efficiency test is required (for example, that a test has not been successfully completed since initiation of current engine operation), and that appropriate operating conditions are met, including that engine RPM and load are within preselected ranges and that the mean value of a downstream exhaust gas EGO sensor output signal has a value corresponding to operation within the window or functioning range of the catalytic converter. Preferably, the output signal of the downstream EGO sensor is passed through a lowpass filter to obtain the mean value. The engine RPM and load are monitored during the entire test period, and the test is aborted if either fails to remain substantially constant. Both the pre-converter and the post-converter feedback loops are opened, the feedback control signals normally supplied by these loops being "frozen" at the value each had at commencement of the test. In addition, an A/F modulation signal, preferably a square wave of approximately ±0.3 A/F at 1.6 Hertz, is superimposed on the pre-converter frozen feedback signal to replace the limit cycle air/fuel oscillation which normal closed loop operation generates. Thus, in the air/fuel controller 16 in FIG. 1, signal LAMBDA is symbolically illustrated to be disengageable from multiplier 92 by switching means 94 taking in its place an A/F modulation signal from A/F modulation signal generator 91.

Preferably, if both the upstream and downstream control loops are opened during the test interval, the system is provided with means for comparing the downstream EGO sensor signal amplitude to a pre-stored value. If the downstream EGO sensor signal rate and its amplitude is greater than the stored value, the test is continued. If, however, the downstream EGO sensor signal amplitude is less than the pre-stored value, the catalytic converter may be declared functional at an acceptable efficiency level and the test may be terminated. This would indicate that the oxygen storage of the converter is very high and that the converter conversion efficiency is also very high. In the system illustrated in FIG. 1, comparator means 95 is provided for receiving and comparing the downstream EGO sensor signal. In the same way, if the downstream control loop remains closed, the frequency of the downstream signal can be compared to a reference value and the test terminated if it is less.

If the test is continued (or if the aforesaid optional feature is not provided in the efficiency measuring system), the mean value of the downstream EGO sensor output signal is measured and temporarily stored as a reference value. In the system of FIG. 1, comparator means 95 is provided for measuring and storing the reference value. Such reference value is obtained during an initial non-perturbation interval of the test period. Thereafter, during a perturbation interval of the test period, a suitable command or perturbation signal is applied to provide individual cylinder-to-cylinder air/fuel maldistribution. Preferably, maldistribution is symmetrical above and below the average or mean air/fuel ratio, alternately from 6%-12% above and below such average, most preferably 10% above and below the average. In the embodiment of FIG. 1, individual cylinder air/fuel controller 18 comprises perturbation signal generating means 118 to provide such perturbation signal to controller 114. Controller 114 implements such perturbation signal in generating trim signals $t_{1-4}$ to the individual cylinders. The mean value of the downstream EGO sensor output signal is then observed by comparator means 75 for exhaust gas from the engine during the cylinder-to-cylinder air/fuel perturbation. If the converter is good, the mean value of the signal will differ less than a predetermined amount from the non-perturbation mean value previously stored as a reference value. Preferably, comparator means 75 determines the difference between the non-perturbation interval mean value and the perturbation interval mean value, and then compares the magnitude of that difference to a preselected stored value corresponding to minimum acceptable converter efficiency. Those skilled in the art will recognize, of course, that there will be a delay, typically several seconds, for exhaust gas from the engine to reach the downstream EGO sensor through exhaust manifolds and catalytic converter, etc. Comparator means 75 preferably accommodates such delay in accordance with techniques well known to those skilled in the art.

If the difference between the non-perturbation interval mean value and the perturbation interval mean value is greater than the stored reference value, the system preferably provides a malfunction or failure signal. Thus, comparator means 75 may actuate a malfunction indicator light (MIL) and/or an appropriate code may be stored in the on-board computer. The test now being completed, the cylinder-to-cylinder air/fuel perturbation signal is deleted from trim signals $t_{1-4}$, the A/F modulation signal is terminated and the upstream and downstream loops are closed to again generate correction signal LAMBDA.

In accordance with a second preferred technique for cylinder-to-cylinder perturbation testing of catalytic converter efficiency, the monitoring test is commenced as described above in connection with the prior preferred technique, except that the downstream EGO sensor feedback control loop is left closed. The upstream EGO sensor feedback control loop is opened and the feedback signal normally supplied by this loop is frozen at its then value. In addition, an A/F modulation signal is superimposed on the "frozen" upstream feedback signal to simulate the limit-cycle air/fuel oscillation normally produced by the upstream loop. The mean value of the downstream feedback control loop signal is measured and temporarily stored as a reference value. As in the first preferred technique, the converter efficiency test may optionally include the step of comparing the downstream feedback signal to prior to the cylinder-to-cylinder perturbation to a pre-stored value, and the converter declared to pass the test if the comparison so indicates. Following the initial non-perturbation interval, a perturbation signal is provided during a perturbation interval of the test period to generate cylinder-to-cylinder air/fuel maldistribution as described above. The mean value of the post-converter feedback control loop signal is measured for the exhaust gas from such perturbation interval and compared to the non-perturbation interval mean value. Such comparison preferably is carried out as described above, by comparing the difference in the mean value to a previously selected and stored reference value.

Because the post-converter feedback control loop gain is generally quite low, the time required for the post-converter feedback control loop signal to stabilize in the above-described second technique may be somewhat longer than the time required for it to stabilize in the first technique. The second technique provides the advantage, however, that the post-converter feedback signal has a somewhat greater operating range than the unfiltered post-converter EGO sensor output signal used in the first technique. While not wishing to be bound by theory, this is presently understood to be due to the fact that the EGO sensor output signal can saturate when the post-converter feedback loop is open (as in the first technique), whereas the feedback signal will have a large operating range when the post-converter loop is closed (as in the second method).

In the second technique, as in the first technique, the cylinder-to-cylinder perturbation is terminated at the end of the test period, except that those skilled in the art will readily understand that the sequence of the perturbation interval and the non-perturbation interval may be reversed. A suitable signal is generated if the converter does not pass the test and, optionally, if it does.

It should be recognized that the impact of the perturbation signal during test mode operation on actual engine performance will generally be imperceptible to a motor vehicle operator.

The reading of the foregoing description of certain preferred embodiments by those skilled in the art will bring to mind various possible alterations and modifications within the spirit and scope of the invention. It is intended that the following claims include all such alterations and modifications within the true scope of the invention.

We claim:

1. An apparatus for monitoring catalytic converter efficiency in treating exhaust gas from an internal combustion engine, comprising:
   a catalytic converter;
   an exhaust conduit means for passing downstream exhaust gas from the catalytic converter;
   a downstream EGO sensor mounted for exposure to the downstream exhaust gas in the exhaust conduit means for generating a downstream output signal corresponding to the oxygen content level of the downstream exhaust gas;
   an air/fuel ratio perturbation means for perturbing the air/fuel ratio at which fuel is supplied to the engine during a perturbation period, each cylinder air/fuel ratios being perturbed individually above and below a mean air/fuel ratio;
   comparison means for performing a comparison of the downstream output signal for exhaust gas from the engine during the perturbation period to the downstream output signal for exhaust gas from the engine during an adjacent non-perturbation time period; and
   test result signal means for generating a signal at least when the comparison indicates catalytic converter efficiency below the minimum acceptable efficiency.

2. The apparatus of claim 1 wherein the air/fuel ratio perturbation means perturbs the air/fuel ratio 6–12% from the mean air/fuel ratio.

3. The apparatus of claim 1 wherein the air/fuel ratio perturbation means perturbs the air/fuel ratio substantially symmetrically above and below the mean air/fuel ratio.

4. The apparatus of claim 1 wherein the perturbation period and the non-perturbation period are adjacent one another and together span a time period of about 20 seconds.

5. The apparatus of claim 1 wherein the comparison means performs said comparison by comparing (a) the difference between (i) average voltage of the output signal during the perturbation period and (ii) average voltage of the output signal during the non-perturbation period, to (b) a stored reference value.

6. The apparatus of claim 1 further comprising fuel control means for controlling the air/fuel ratio during normal engine operation, the perturbation period and the non-perturbation period together comprising a test interval interruption of normal engine operation.

7. The apparatus of claim 6 wherein the feedback control means, during normal operating mode, controls the air/fuel ratio based, at least in part, on a feedback control loop generating an input signal to the fuel control means based, at least in part, on the downstream output signal.

8. A method of monitoring efficiency of a catalytic converter in treating exhaust gas from an internal combustion engine having multiple cylinders and fuel control means for generating fuel control signals in response to input signals for individually controlling electronically actuated fuel injectors coupled to each cylinder to maintain a mean air/fuel ratio among the cylinders, the method comprising:
   perturbing the air/fuel ratio at which air and fuel are supplied to the engine during a perturbation period, each cylinder air/fuel ratio being perturbed individually, alternating above and below the mean air/fuel ratio;
   performing a comparison of an output signal of an EGO sensor exposed to the exhaust gas downstream of the catalytic converter for the perturbation period to the output signal of said EGO sensor for an adjacent non-perturbation time period; and
   generating a test result signal at least when the comparison indicates catalytic efficiency below a minimum acceptable catalytic converter efficiency level.

9. The method of claim 8 wherein the comparison of the output signals comprises measuring as a first value mean voltage of the output signal for the adjacent time period, measuring as a second value mean voltage of the output signal for the perturbation period, measuring as a third value the difference between the first value and the second value, and comparing the third value to a stored reference value corresponding to said minimum acceptable catalytic converter efficiency.

10. The method of claim 8 wherein the air/fuel ratio of each cylinder individually is perturbed from 6–12% alternating above and below the mean air/fuel ratio during the perturbation period.

11. A method for controlling the air/fuel ratio of an air and fuel mixture fed to an internal combustion engine and for periodically monitoring the efficiency of a catalytic converter treating exhaust gas exposed to a first EGO sensor means for generating a first EGO signal having a value corresponding to oxygen content level therein as it is passed from the engine to the catalytic converter through first exhaust gas conduit means, and thereafter exposed to a second EGO sensor means for generating a second EGO signal having a value corresponding to oxygen content level therein as it is passed from the catalytic converter through a second exhaust gas conduit means, the engine having multiple cylinders and fuel control means for generating individual injector control signals for individually controlling corresponding electronically actuated fuel injectors coupled, one each, to a corresponding one of said cylinders, the method comprising the steps of:

A) operating the fuel control means during a normal operating mode for controlling the air/fuel ratio based, at least in part, on (a) a first feedback control loop generating an input signal to the fuel control means based, at least in part, on the first EGO signal, and (b) a second feedback control loop generating an input signal to the fuel control means based, at least in part, on the second EGO signal, to maintain a mean air/fuel ratio among the cylinders, the mean air/fuel ratio having a value which cycles at a limit cycle frequency generally within limits defining a range about a stoichiometric value;

B) switching to a test mode, comprising (a) initiating a test interval, (b) opening the first feedback control loop and generating an A/F modulation signal as an input signal to the fuel control means simulating the limit cycle frequency immediately prior to initiating the test interval, (c) measuring a first test value based on the second EGO signal corresponding to exhaust gas from the engine during a non-perturbation period of the test interval, (d) generating, during a perturbation period of the test interval, a perturbation signal as an input signal to the fuel control means to perturb the air/fuel ratio of each cylinder individually alternating above and below the mean air/fuel ratio of the non-perturbation period, and measuring a second test value based on the second EGO signal corresponding to exhaust gas from the engine during the perturbation period, (e) performing a comparison of the first test value and the second test value, and (f) generating a test result signal at least when the comparison indicates catalytic converter efficiency below a minimum acceptable catalytic converter efficiency; and C) returning to normal operating mode.

12. The method of claim 11 wherein the comparison performed in step B(e) comprises comparing the difference between the first test value and the second test value to a stored reference value corresponding to the minimum acceptable catalytic converter efficiency.

13. The method of claim 11 wherein the first test value is the mean value of the second EGO signal corresponding to exhaust gas from the engine during the non-perturbation period of the test interval and the second test value is the mean value of the second EGO signal corresponding to exhaust gas from the engine during the perturbation period of the test interval.

14. The method of claim 11 wherein both the first feedback control loop and the second feedback control loop are opened during the test interval.

15. The method of claim 11 wherein the A/F modulation signal is a square wave signal having amplitude of approximately ±0.3 A/F and frequency of approximately 1.6 Hertz.

16. The method of claim 11 wherein the perturbation signal perturbs the air/fuel ratio 6–12% from the mean air/fuel ratio of the non-perturbation period.

17. The method of claim 11 wherein the test interval is 20 seconds.

18. The method of claim 11 wherein the second feedback remains closed during the test interval, further comprising the step of comparing the frequency of oscillation of the second EGO signal during the non-perturbation period of the test interval, and terminating the test interval if the oscillation frequency of the second EGO signal is less than a pre-stored frequency reference value.

19. The method of claim 11 wherein both the first feedback control and the second feedback control loop are opened during the test interval, further comprising the step of comparing the amplitude of the second EGO signal during the non-perturbation period of the test interval to a pre-stored amplitude reference value, and terminating the test interval if the amplitude of the second EGO signal is less than the pre-stored amplitude reference value.

* * * * *